Feb. 9, 1943.  H. M. DODGE  2,310,404
APPARATUS FOR THE PRODUCTION OF MOLDED ARTICLES
Filed July 30, 1940
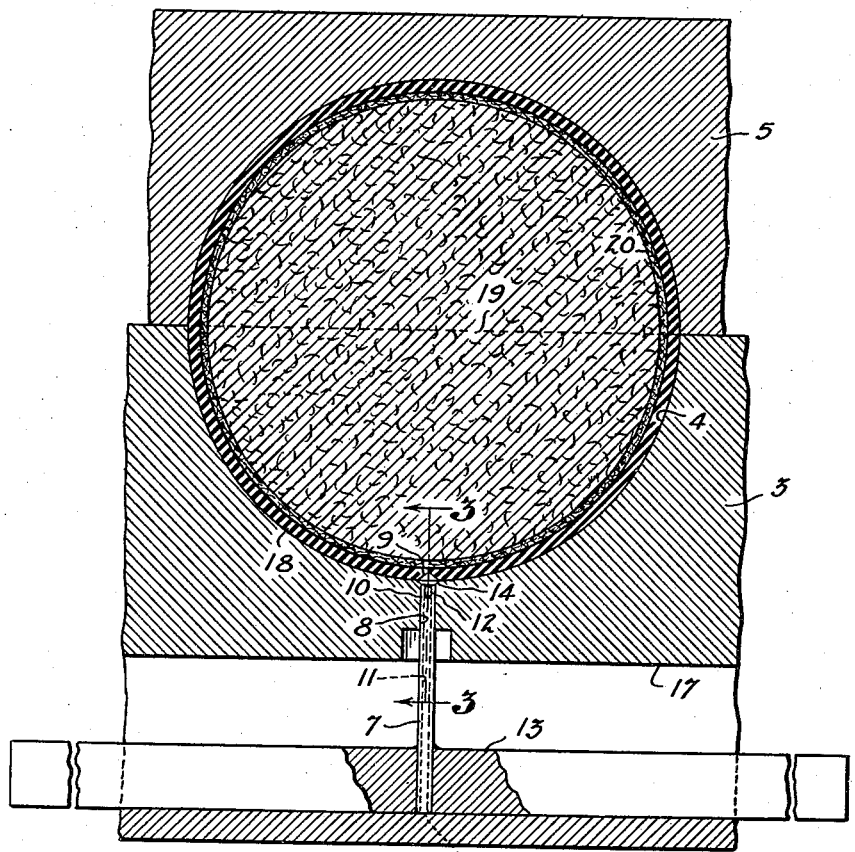
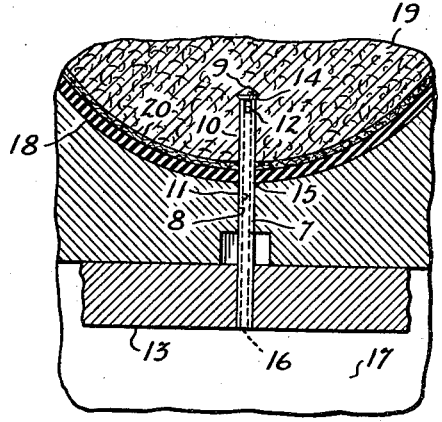
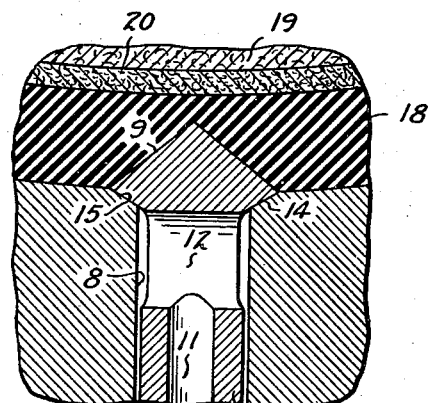
INVENTOR
Howard M. Dodge
BY Evans & McCoy
ATTORNEYS Patented Feb. 9, 1943

2,310,404

UNITED STATES PATENT OFFICE 2,310,404

APPARATUS FOR THE PRODUCTION OF MOLDED ARTICLES

Howard M. Dodge, Wabash, Ind., assignor to The General Tire & Rubber Company, Summit, Ohio, a corporation of Ohio Application July 30, 1940, Serial No. 348,400

4 Claims. (Cl. 18—42)

This invention relates to an apparatus for producing articles having an entire surface of impervious molded rubber-like material. It particularly relates to a method of forming articles having a molded impervious surface envelope, wherein gas pressure developed internally of the envelope is utilized to aid in forcing it in contact with the walls of the mold.

In the preparation of articles having a complete molded rubber surface envelope, it is desirable that high pressure be used to force the rubber to take the contour of the mold and to prevent the formation of bubbles or blisters. Such pressure may be developed by disposing suitable gas generating materials, such as water or chemicals, in the inside of the uncured rubber envelope, or by supplying air through a tube which leads through the exterior of the mold into the inside of the rubber envelope. In either of these cases, the pressure must be relieved before the material can be removed from the mold in order that rupture of the envelope or destruction of the article will not occur.

Heretofore the mold was either cooled before removing the article therefrom or it was provided with a bleeder tube having a closable opening which extends into the center of the article. These processes are undesirable, the latter especially, because the surface of the impervious rubber envelope has an opening caused by the tube during the molding operation and the hole is not readily repaired without substantial expense.

It is an object of the present invention to provide apparatus for molding articles with a continuous, impervious surface layer of rubber wherein the article may be removed from the mold without cooling and without destroying the article and wherein any opening in the surface envelope of the article produced closes by elasticity inherent therein.

Another object of the present invention is to provide apparatus for molding articles with an impervious rubber surface layer, which apparatus is adapted to permit the formation of a continuous molded skin on the article and to relieve pressure within the article without opening of the mold.

A further object of the invention is to provide apparatus for producing hollow articles having a continuous surface layer of rubber, wherein high pressure may be generated in the article to force all portions of the surface envelope in contact with the surface of the mold and the pressure inside the envelope may be relieved without removing the article from the mold and without forming an opening in the envelope which requires repair.

Other objects will be apparent from the following description of the invention as illustrated by the drawing, in which:

Figure 1 is a sectional view through a portion of an indoor baseball mold having a baseball therein and showing the internal pressure relieving element in the position occupied during the molding of the article;

Fig. 2 is a sectional view through the same mold and showing the pressure relieving element extended into the baseball core to relieve internal pressure within the envelope;

Fig. 3 is a sectional view through the pressure relieving element and the mold on the line 3—3 of Fig. 1.

Referring more particularly to the drawing in which like parts are illustrated by like numerals of reference, a mold for forming articles, such for example as the baseball, with a relatively impervious molded surface envelope, may have separable sections 3 and 5 which may enclose a cavity 4.

According to the present invention movable means such as the pin 7 is provided for puncturing the vulcanized imperviously molded envelope to permit the escape of gas from its interior before the mold is opened and the article removed therefrom. Such means is disposed through an opening 8 in the wall of said mold cavity and is adapted to be either protruded and projected into said cavity so as to puncture the surface envelope of the article therein, or to be retracted substantially entirely from said cavity so that a complete vulcanized envelope may be formed in the mold. Means such as the pin actuating rod 13 which carries the envelope puncturing means such as the pin 7, is provided to actuate and control the protrusion of the envelope puncturing means into said cavity. Such actuating means is operable from the exterior of said mold and is adapted to be raised and lowered within the recess 17 to regulate the amount of protrusion of pin 7 within the cavity 4, as illustrated in Figs. 1 and 2.

The envelope puncturing means 7 has a pointed end portion 9 and a body portion 10. The body portion 10 has a passageway 11 extending longitudinally thereof, which passageway has an entranceway or port 12 near the pointed end portion of said pin and an exhaust port 16 near its base portion. The passageway permits the passage of gas from the inside of the envelope to the exterior of the mold when the pin is projected through the envelope. The puncturing end portion 9 is preferably relatively blunt and of a conical shape. A sealing face 14, preferably of frusto-conical shape, is disposed around said pin between said point 9 and said entranceway or port 12. A countersunk sealing surface 15, also preferably of frusto-conical shape, is provided at the juncture of the opening 8 with the surface of the cavity 4. The sealing surface 15 is adapted to cooperate with the sealing face 14 to seal the opening 8 to the passage of gas or liquid from said cavity when said pin 7 is in the retracted condition.

In the preparation of hollow articles such as baseballs, the uncured envelope 18 of a suitable rubber compound is disposed entirely about a suitable center or core 19, which may be and preferably is moist kapok or other fibrous material that has been preformed or compacted to a spherical shape. The core for indoor baseballs may also have a layer of reinforcing cords or threads 20 wound about the preformed or compacted core 19 if desired. The core with the uncured envelope 18 thereon is then inserted into the cavity 4 of the mold with the mold puncturing means 7 in the retracted position so that the point 9 does not extend an appreciable distance into the envelope 18.

The closed mold with the article therein is cured at a suitable temperature and during the curing process a substantial amount of pressure is developed within the envelope 18. Such pressure may be due to vaporization of moisture within the core 19 or be derived from suitable gas forming chemicals therein. It tends to force the envelope 18 strongly against the walls of the cavity 4, causing it to assume the shape of the cavity.

As soon as the cure of the envelope 18 is completed, the pin actuating rod carrying the pin 7 is raised to the position illustrated in Fig. 2, causing the point 9 to penetrate the impervious envelope 18 and causing a substantial portion of the body 10 with the entranceway 12 to be protruded within the envelope 18. As soon as the port 12 enters the interior of the envelope 18 any pressure therein above atmospheric is relieved by the escape of gas through the passageway 11, out through the exhaust port 16 to the exterior of the mold. The portions 3 and 5 of the mold may then be immediately separated and the baseball removed, without tendency for any separation of the envelope 18 from the core 19.

By curing the envelope in complete form without having a bleeder tube extending therethrough during the curing process, the portion of the envelope in contact with the point 9 of the pin 7 tends to retain its molded shape so that after the pin 7 is withdrawn from the envelope the elasticity of the rubber substantially heals the puncture. The puncture in the envelope becomes substantially invisible and a repair of the cover or envelope 18 is not necessary.

It will be understood that numerous modifications of the construction shown may be resorted to without departing from the spirit of this invention as defined in the appended claims.

I claim:
1. Apparatus for forming articles having a molded surface envelope of rubber-like material comprising a mold having separable sections enclosing a cavity, an opening in the wall of said mold, movable envelope puncturing means disposed in said opening and adapted to be projected into said cavity and within the surface envelope of the article and to be retracted therefrom, said puncturing means being formed to provide a passage for escape of gas from the interior of the molded article through said opening and having means for effecting a seal of said opening at its juncture with the inner surface of the mold when in the retracted position, and means for actuating said puncturing means.

2. Apparatus for forming spherical articles with relatively impervious molded rubber-like surface envelope, comprising a mold with a spherical cavity therein, an opening in the wall of said cavity, said opening having a countersunk sealing surface adjacent its juncture with the surface of said cavity, a movable pin having a relatively bluntly pointed conical end, a body portion with a passageway for the passage of gas to the exterior of said mold, said passageway extending longitudinally of said body portion and having a port near said point, a sealing face disposed between said opening and said point, said face being adapted to cooperate with said sealing surface to control the passage of gas through said passageway and through said opening, means operable from the exterior of said mold for changing the amount of protrusion of said pin into said cavity and for controlling the passage of gas through said opening.

3. Apparatus for forming spherical articles with relatively impervious molded rubber-like surface envelope, comprising a mold with a spherical cavity therein, an opening in the wall of said cavity, said opening having a countersunk frusto-conical sealing surface adjacent its juncture with the surface of said cavity, a movable pin having a relatively bluntly pointed conical end and a body portion with a passageway for the passage of gas to the exterior of said mold, said passageway extending longitudinally of said body portion and having an entranceway near said point, a frusto-conical sealing face disposed between said opening and said point, said face being adapted to cooperate with said sealing surface adjacent said opening to control the passage of gas through said passageway and through said opening, means available from the exterior of said mold for changing the protrusion of said pin into said cavity and for controlling the passage of gas through said opening.

4. Apparatus for forming articles having a molded surface envelope of resilient rubber-like material comprising a mold having separable sections enclosing a cavity, an opening in the wall of said mold, movable envelope puncturing means disposed in said opening and adapted to be optionally projected in said cavity and to be retracted therefrom, said puncturing means having a passageway to provide for passage of gas through said opening when in the projected condition, means operable from the exterior of said mold for actuating said envelope puncturing means to project it into said cavity and to retract it therefrom, and means for automatically effecting a seal of said opening and of said passageway at the juncture in the surface of said cavity with said opening to prevent flow of plastic material through said opening and into said passageway when said envelope puncturing means is in the fully retracted position.

HOWARD M. DODGE.